(12) United States Patent
Larin et al.

(10) Patent No.: US 7,953,955 B2
(45) Date of Patent: May 31, 2011

(54) METHODS AND APPARATUS FOR AUTOMATED GENERATION OF ABBREVIATED INSTRUCTION SET AND CONFIGURABLE PROCESSOR ARCHITECTURE

(75) Inventors: Sergei Yurievich Larin, Durham, NC (US); Gerald George Pechanek, Cary, NC (US); Thomas M. Conte, Apex, NC (US)

(73) Assignee: Altera Corporation., San Jose, CA (US)

( * ) Notice: Subject to any disclaimer, the term of this patent is extended or adjusted under 35 U.S.C. 154(b) by 0 days.

(21) Appl. No.: 12/967,662

(22) Filed: Dec. 14, 2010

(65) Prior Publication Data

US 2011/0083001 A1    Apr. 7, 2011

Related U.S. Application Data

(62) Division of application No. 11/340,072, filed on Jan. 26, 2006, now Pat. No. 7,865,692, which is a division of application No. 10/119,660, filed on Apr. 10, 2002, now Pat. No. 7,028,286.

(60) Provisional application No. 60/283,582, filed on Apr. 13, 2001.

(51) Int. Cl.
*G06F 12/00* (2006.01)

(52) U.S. Cl. ........ 711/217; 711/220; 711/206; 711/125; 711/E12.058; 711/E12.002; 712/208; 712/210; 712/300

(58) Field of Classification Search ........................ None
See application file for complete search history.

(56) References Cited

U.S. PATENT DOCUMENTS

2002/0013691 A1 * 1/2002 Warnes .......................... 703/22
* cited by examiner

*Primary Examiner* — Reginald G Bragdon
*Assistant Examiner* — Baboucarr Faal
(74) *Attorney, Agent, or Firm* — Priest & Goldstein, PLLC

(57) ABSTRACT

A systematic approach to architecture and design of the instruction fetch mechanisms and instruction set architectures in embedded processors is described. This systematic approach allows a relaxing of certain restrictions normally imposed by a fixed-size instruction set architecture (ISA) on design and development of an embedded system. The approach also guarantees highly efficient usage of the available instruction storage which is only bounded by the actual information contents of an application or its entropy. The result of this efficiency increase is a general reduction of the storage requirements, or a compression, of the instruction segment of the original application. An additional feature of this system is the full decoupling of the ISA from the core architecture. This decoupling allows usage of a variable length encoding for any size of the ISA without impacting the physical instruction memory organization or layout and branching mechanism as well as tuning of the execution core to the application. A hardware embodiment described herein allows application of the above mentioned high-entropy encoding technique in actual embedded processor using today's technology without posing significant strain on timing requirements.

14 Claims, 15 Drawing Sheets

FIG. 4

```
         401       402                        403
          ⎫         ⎫                          ⎫
REAL GROUP (270) USED (120) TIMES ORIGINAL INSTRUCTION (LD)-LOAD;
CHANGE VECTOR                                         ⎽405
   404⎯⎯⎯00x00000x0xxxxxx0000xxxx000xxxx0 xy mask 20bf0f1e x size 16,y size 16
variation 0010000010100011000011100010110 x_part 0x0000 y_part 0xe37b index x 7, index y 947
variation 0010000010001010000011100010100 x_part 0x0000 y_part 0xca7a index x 7, index y 948
variation 0010000010011101000011100010100 x_part 0x0000 y_part 0xdd7a index x 7, index y 949
variation 0000000000100111000000000000000 x_part 0x0000 y_part 0x2700 index x 7, index y 29
variation 0010000010100101000011100011010 x_part 0x0000 y_part 0xe57d index x 7, index y 950
variation 0010000010100111000011100011000 x_part 0x0000 y_part 0xe77c index x 7, index y 951
variation 0010000010100101000101000001010 x_part 0x0000 y_part 0xe5a5 index x 7, index y 952
variation 0010000010100100000101000001010 x_part 0x0000 y_part 0xe4a5 index x 7, index y 953
variation 0010000010100100000101000001100 x_part 0x0000 y_part 0xe4a6 index x 7, index y 760
⎳⎵⎵⎵⎵⎵⎵⎵⎵⎵⎵⎵⎵⎵⎵⎵⎵⎵⎵⎵⎵⎵⎵⎵⎵⎵⎴ ⎳⎵⎴  ⎳⎵⎵⎵⎴ ⎳⎵⎵⎵⎵⎴
              406                 407     408        409
```

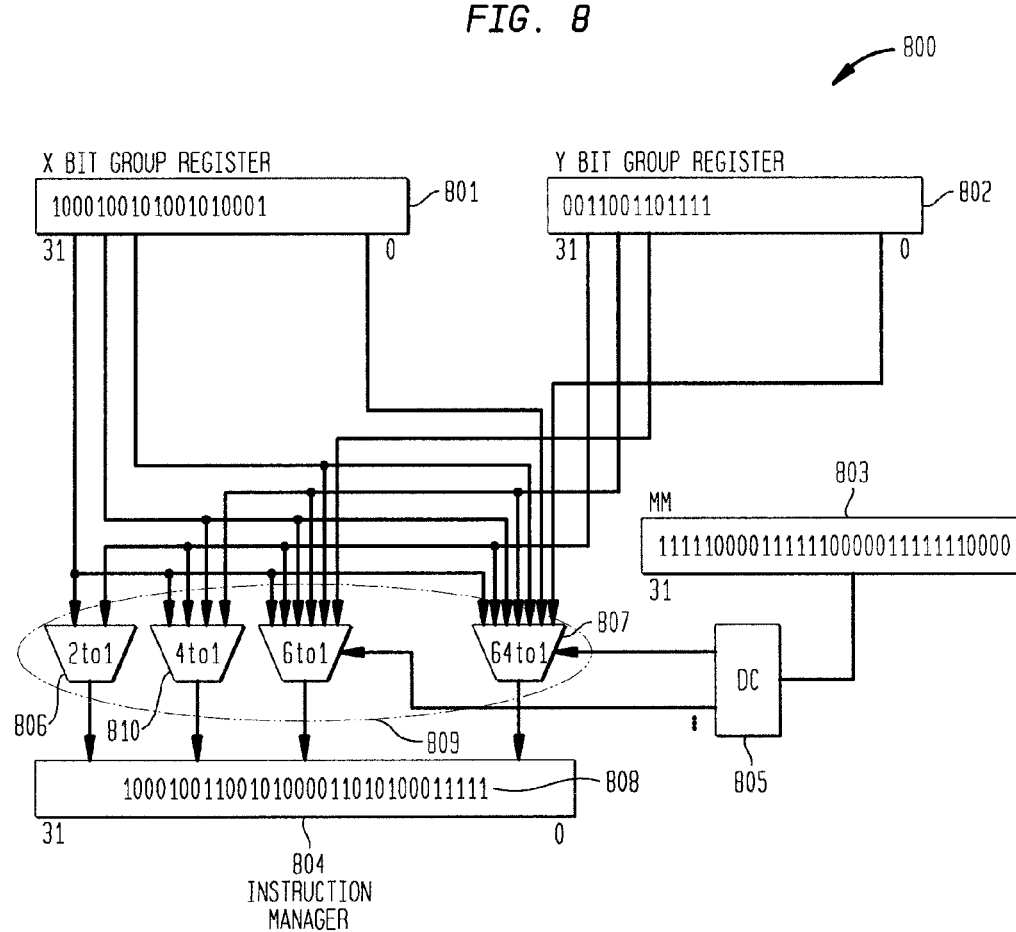

METHODS AND APPARATUS FOR AUTOMATED GENERATION OF ABBREVIATED INSTRUCTION SET AND CONFIGURABLE PROCESSOR ARCHITECTURE

The present application is a divisional of U.S. Pat. No. 7,865,692 B2 Ser. No. 11/340,072 filed Jan. 26, 2006 which is a divisional of U.S. Pat. No. 7,028,286 Ser. No. 10/119,660 filed Apr. 10, 2002 which in turn claims the benefit of U.S. Provisional Application Ser. No. 60/283,582 filed Apr. 13, 2001, all of which are incorporated by reference herein in their entirety.

FIELD OF THE INVENTION

The present invention relates generally to improved methods and apparatus for increasing the code or instruction density utilizing compression or abbreviation, and mechanisms for the translation or interpretation of the compressed or abbreviated code. More particularly, the present invention describes advantageous automated techniques for statistically-based generation of an instruction set abbreviation which strike a desired balance of cost and performance for a specific application or set of applications.

BACKGROUND OF THE INVENTION

A class of embedded systems exists which presents critical requirements to the tradeoff between instruction code density and performance of those systems. There is a great need for a framework and an automated solution for finding the best cost-performance balance between all the components involved. It should be recognized that customizing and adjusting an original instruction set architecture (ISA) to fit the needs and requirements of each particular application can be done by hand on a case by case basis to yield a near optimal solution. However, the costs of such an approach may be unacceptably high. Thus, it will be recognized that reducing human involvement will be highly desirable.

SUMMARY OF THE INVENTION

To this end, according to one aspect of the present invention, human interaction may be limited to involvement such as establishing high level specifications of the goals to be achieved and limiting the field in which the system will be used, and choosing criteria which should be optimized. Advantageously, the subsequent analysis process may be fully automated. To this end, the present invention provides methods and apparatus to create and utilize a unique application bounded subset of the original ISA in a digital signal processor (DSP) system. It also provides methods and apparatus for decoding of this subset and minimizing the impact on the run time of the application.

These and other advantages of the present invention will be apparent from the drawings and the Detailed Description which follow.

BRIEF DESCRIPTION OF THE DRAWINGS

FIG. 4 illustrates instruction variations within one group with a single change vector.

FIG. 8 illustrates a fully parallel implementation of shuffler hardware using a set of multiplexers and a priority decoder.

DETAILED DESCRIPTION

Figure 1:
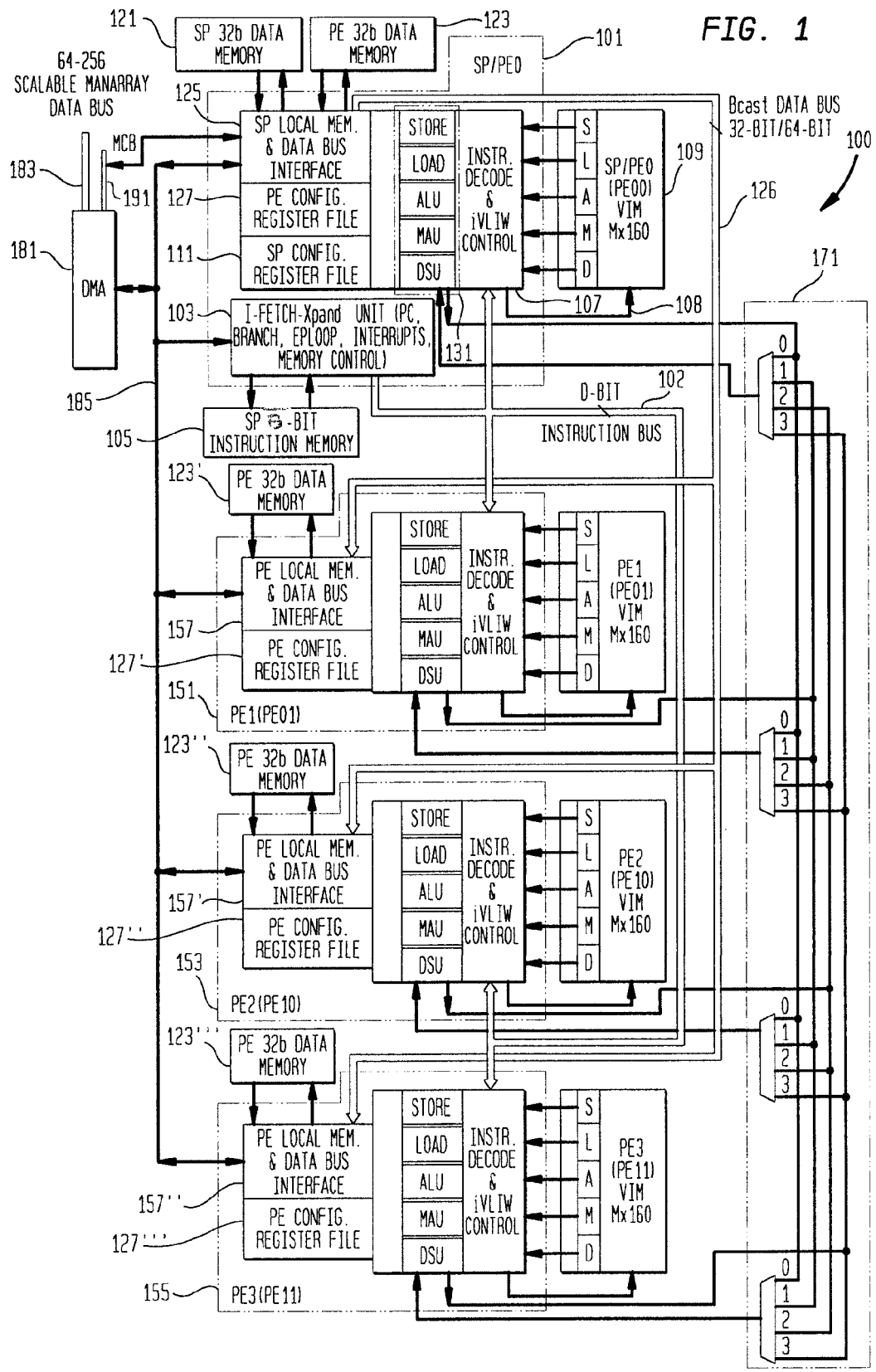
FIG. 1 illustrates an exemplary architecture for embodying the present invention, a 2×2 ManArray architecture

Further details of a presently preferred ManArray core, architecture, and instructions for use in conjunction with the present invention are found in:

U.S. patent application Ser. No. 08/885,310, filed Jun. 30, 1997, now U.S. Pat. No. 6,023,753;

U.S. patent application Ser. No. 08/949,122 filed Oct. 10, 1997, now U.S. Pat. No. 6,167,502;

U.S. patent application Ser. No. 09/169,256 filed Oct. 9, 1998, now U.S. Pat. No. 6,167,501;

U.S. patent application Ser. No. 09/169,255 filed Oct. 9, 1998, now U.S. Pat. No. 6,343,356;

U.S. patent application Ser. No. 09/169,072 filed Oct. 9, 1998, now U.S. Pat. No. 6,219,776;

U.S. patent application Ser. No. 09/187,539 filed Nov. 6, 1998, now U.S. Pat. No. 6,151,668;

U.S. patent application Ser. No. 09/205,588 filed Dec. 4, 1998, now U.S. Pat. No. 6,173,389;

U.S. patent application Ser. No. 09/215,081 filed Dec. 18, 1998, now U.S. Pat. No. 6,101,592;

U.S. patent application Ser. No. 09/228,374 filed Jan. 12, 1999, now U.S. Pat. No. 6,216,223;

U.S. patent application Ser. No. 09/471,217 filed Dec. 23, 1999, now U.S. Pat. No. 6,260,082;

U.S. patent application Ser. No. 09/472,372 filed Dec. 23, 1999, now U.S. Pat. No. 6,256,683;

U.S. patent application Ser. No. 09/543,473 filed Apr. 5, 2000, now U.S. Pat. No. 6,321,322;

U.S. patent application Ser. No. 09/350,191, filed Jul. 9, 1999 now U.S. Pat. No. 6,356,994;
U.S. patent application Ser. No. 09/238,446, filed Jan. 28, 1999 now U.S. Pat. No. 6,366,999;
U.S. patent application Ser. No. 09/267,570, filed Mar. 12, 1999 now U.S. Pat. No. 6,446,190;
U.S. patent application Ser. No. 09/337,839 filed Jun. 22, 1999 now U.S. Pat. No. 6,839,728;
U.S. patent application Ser. No. 09/422,015, filed Oct. 21, 1999 now U.S. Pat. No. 6,408,382;
U.S. patent application Ser. No. 09/432,705, filed Nov. 2, 1999 now U.S. Pat. No. 6,697,427;
U.S. patent application Ser. No. 09/596,103, filed Jun. 16, 2000 now U.S. Pat. No. 6,397,324;
U.S. patent application Ser. No. 09/598,567, filed Jun. 21, 2000 now U.S. Pat. No. 6,826,522;
U.S. patent application Ser. No. 09/598,564, filed Jun. 21, 2000 now U.S. Pat. No. 6,622,234;
U.S. patent application Ser. No. 09/598,566, filed Jun. 21, 2000 now U.S. Pat. No. 6,735,690,
U.S. patent application Ser. No. 09/598,558 filed Jun. 21, 2000;
U.S. patent application Ser. No. 09/598,084, filed Jun. 21, 2000 now U.S. Pat. No. 6,654,870;
U.S. patent application Ser. No. 09/599,980, filed Jun. 22, 2000 now U.S. Pat. No. 6,748,517;
U.S. patent application Ser. No. 09/711,218, filed Nov. 9, 2000 now U.S. Pat. No. 6,754,687;
U.S. patent application Ser. No. 09/747,056, filed Dec. 12, 2000 now U.S. Pat. No. 6,704,857;
U.S. patent application Ser. No. 09/853,989, filed May 11, 2001 now U.S. Pat. No. 6,845,445;
U.S. patent application Ser. No. 09/886,855 filed Jun. 21, 2001;
U.S. patent application Ser. No. 09/791,940, filed Feb. 23, 2001 now U.S. Pat. No. 6,834,295;
U.S. patent application Ser. No. 09/792,819 filed Feb. 23, 2001;
U.S. patent application Ser. No. 09/791,256 filed Feb. 23, 2001 now U.S. Pat. No. 6,842,811;
U.S. patent application Ser. No. 10/013,908 filed Oct. 19, 2001;
U.S. Serial application Ser. No. 10/004,010 filed Nov. 1, 2001;
U.S. application Ser. No. 10/004,578, filed Dec. 4, 2001 now U.S. Pat. No. 6,624,056;
U.S. application Ser. No. 10/116,221, filed Apr. 4, 2002;
U.S. Provisional Application Ser. No. 60/283,582 filed Apr. 13, 2001;
U.S. Provisional Application Ser. No. 60/287,270 filed Apr. 27, 2001;
U.S. Provisional Application Ser. No. 60/288,965 filed May 4, 2001;
U.S. Provisional Application Ser. No. 60/298,624 filed Jun. 15, 2001;
U.S. Provisional Application Ser. No. 60/298,695 filed Jun. 15, 2001;
U.S. Provisional Application Ser. No. 60/298,696 filed Jun. 15, 2001;
U.S. Provisional Application Ser. No. 60/318,745 filed Sep. 11, 2001;
U.S. Provisional Application Ser. No. 60/340,620 filed Oct. 30, 2001;
U.S. Provisional Application Ser. No. 60/335,159 filed Nov. 1, 2001,
Provisional Application Ser. No. 60/368,509 filed Mar. 29, 2002, all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also utilized to demonstrate the apparatus for the automated generation of abbreviated instructions and configurable processor architecture. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of short instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as further described in U.S. patent application Ser. No. 09/422, 015 filed Oct. 21, 1999 and incorporated by reference herein in its entirety. If an instruction abbreviation apparatus is not used then B is determined by the SIW format. The fetch controller 103 provides the typical functions needed in a programmable processor, such as a program counter (PC), a branch capability, eventpoint loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function, for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), Arithmetic Logic Unit or ALU (A), Multiply Accumulate Unit or MAU (M), and Data Select Unit or DSU (D).

The basic concept of loading the iVLIWs is described in more detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common design PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0 the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast (Bcast) data bus 126. The other PEs, 151, 153, and 155 contain common design physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus (MDB) 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1. The ManArray architecture uses two primary bus interfaces: the ManArray data bus (MDB), and the ManArray control bus (MCB). The MDB provides for high volume data flow in and out of the DSP array. The MCB provides a path for peripheral access and control. The width of either bus varies between different implementations of ManArray processor cores. The width of the MDB is set according to the data bandwidth requirements of the array in a given application, as well as the overall complexity of the on-chip system.

The present invention addresses further work and improvements upon the inventions described in U.S. application Ser. No. 09/422,015 entitled "Methods and Apparatus for Abbreviated Instruction and Configurable Processor Architecture. Due to the nature of the original Manifold Array instruction set architecture (ISA), it packs a great deal of redundancy since it supports various groups of software coded applications without being adapted or optimized with respect to one in particular. As a result, there may be a certain amount of redundancy in the code segment encoded with the original ISA. One aspect of the present invention is to minimize this redundancy in order to increase the information content to code size ratio.

Figure 2:
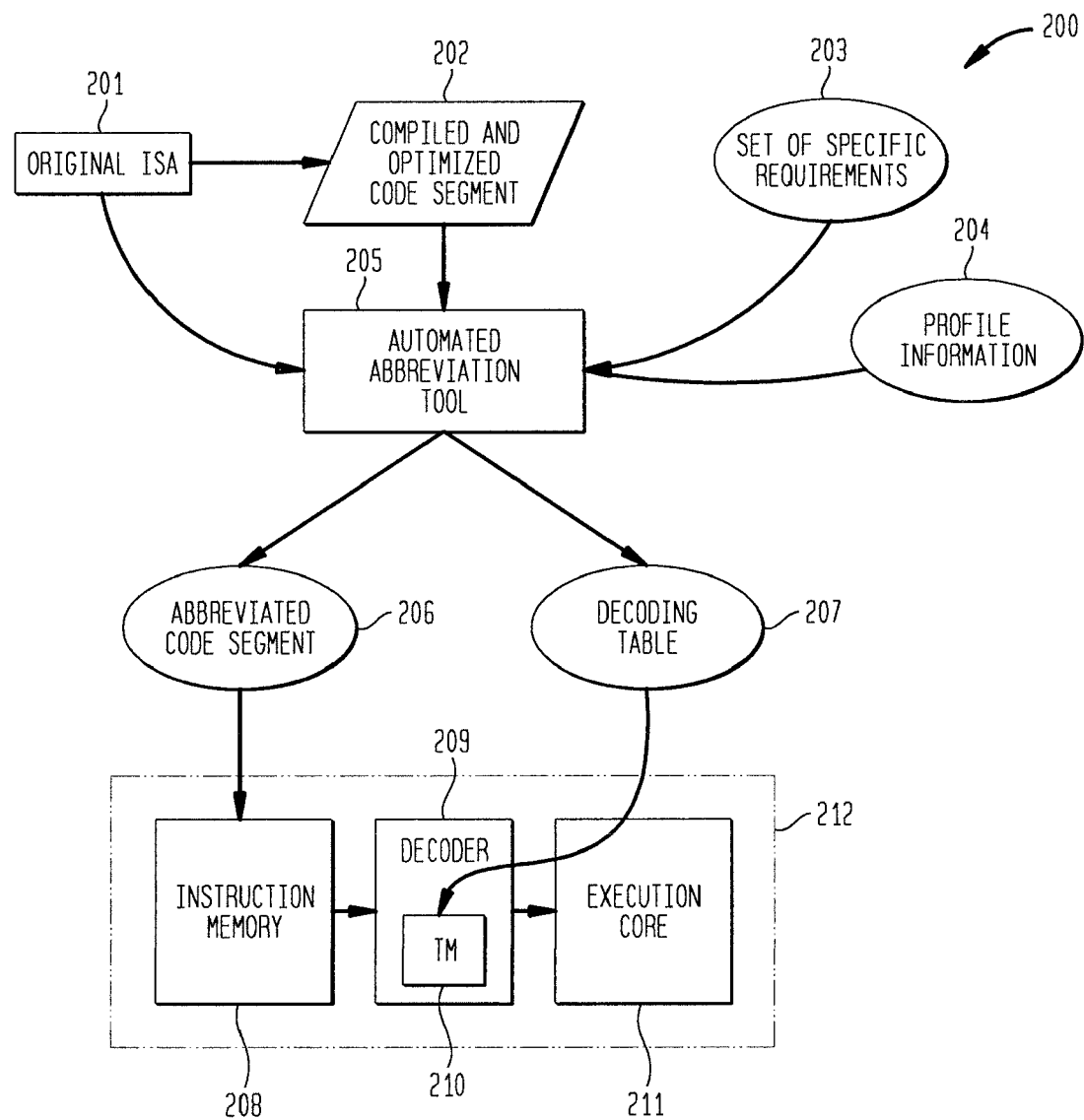
FIG. 2 illustrates a general system and process for the statistical analysis of an application code segment and abbreviated code generation in accordance with the present invention.

A general system 200 for reducing this redundancy is shown in FIG. 2. It includes an original ISA 201, scheduled and optimized for an execution performance application 202 and a set of specific requirements 203 accompanied by dynamic execution profile information for the application 204. Components 201, 202, 203 and 204 serve as inputs to an analysis/abbreviation tool 205. This tool 205 produces an application specific high-density representation 206 of the original application 202 and a decoding table 207. This decoding table 207 in combination with an instruction decoder 209 of a DSP system 212 facilitates the interpretation of the optimized ISA representation 206. The DSP system 212 differs from a non-abbreviated version only by the instruction decoder architecture 209 and access mechanism to instruction memory 208. The decoder 209 in this architecture contains an internal storage or memory element 210, which holds the decoding table 207. Since this storage is small, fast and physically closer to the DSP core 211, it acts as a high-density content caching structure, and could be reused to store uncompressed instructions, as well as the decoding table.

The original abbreviation process described in above mentioned U.S. application Ser. No. 09/422,015 served the purpose of increasing instruction density in a manifold array (ManArray) 2×2 iVLIW single instruction multiple data stream (SIMD) processor, such as the processor 100 shown in FIG. 1.

The present abbreviation process improves upon the previous approach and may include the following steps. An application is compiled, optimized and debugged using the original ManArray 32-bit ISA. No changes are needed in the original compilation process. The result of the compilation phase is an optimized list of instructions (code segment or CS), which could be executed on the target DSP machine. Instruction abbreviation takes place after this list is generated.

During the abbreviation analysis phase, instructions are partitioned into several groups according to a fixed heuristic. Within a group, using provided patterns or masks, each bit pattern is analyzed and separated into two parts—the common bits between instructions of the group and the bits that are unique to each instruction. The number of groups used could vary from one to some arbitrary number. In one aspect of the above mentioned prior application, patterns were created by human analysis of the original code segment and could be generally reused (i.e. fixed) for a class of applications. These groups of instructions were referred to as instruction styles. In the next step, the original (32-bit) instructions were abbreviated down to a fixed size format (variations of 12 through 16 bits are considered), and preference is given to the 14 bit encoding. Each abbreviated instruction was also supplied with a two-bit header which aids in decoding of this instruction and brings the total size to 16 bits. Finally, a decoding mechanism was also described therein. It should be recognized that both human interaction and reuse of group patterns does not guarantee optimal abbreviation for each particular application and in general requires laborious analysis for each new application.

The proposed new techniques for improving the previous approach are to utilize automated application specific and information entropy bounded analysis followed by optimization of the dynamic behavior of the application to produce high density code with minimal or no performance impact as addressed in greater detail below.

Tradeoff Definition

The current invention targets the achievement of an optimal balance between code size, decoding complexity and performance where performance variations may be associated with requiring an additional number of instructions to achieve a specified high density abbreviated encoding. The whole process is made possible by the presence of high logical encoding redundancy in the original code segment. We begin by defining several terms to be used throughout.

It should be recognized that any software coded application has a theoretical minimum information content which fully describes its logical functioning. This information content is measured as the information entropy of the code. The information entropy as defined by Shannon is an average number of binary symbols needed to decode each element of the alphabet. C. E. Shannon, "A Mathematical Theory of Communication", The Bell System Technical Journal, Vol. 27, pp. 374-423 and 623-656, July, October 1948. As applied to the current analysis, application entropy is the minimal number of binary bits needed to encode each unique instruction in the code segment. A hypothetical application with high information entropy uses instructions of variable length, where each bit is used in actual computation towards achieving the goal of the application. In an application with low information entropy, a great portion of the total number of bits in each instruction encoding do not contribute to achieving the goal of the application. Currently, the majority of ISAs use a fixed width instruction encoding which is intended for a maximum complexity application which is rarely achieved.

Figure 3A:
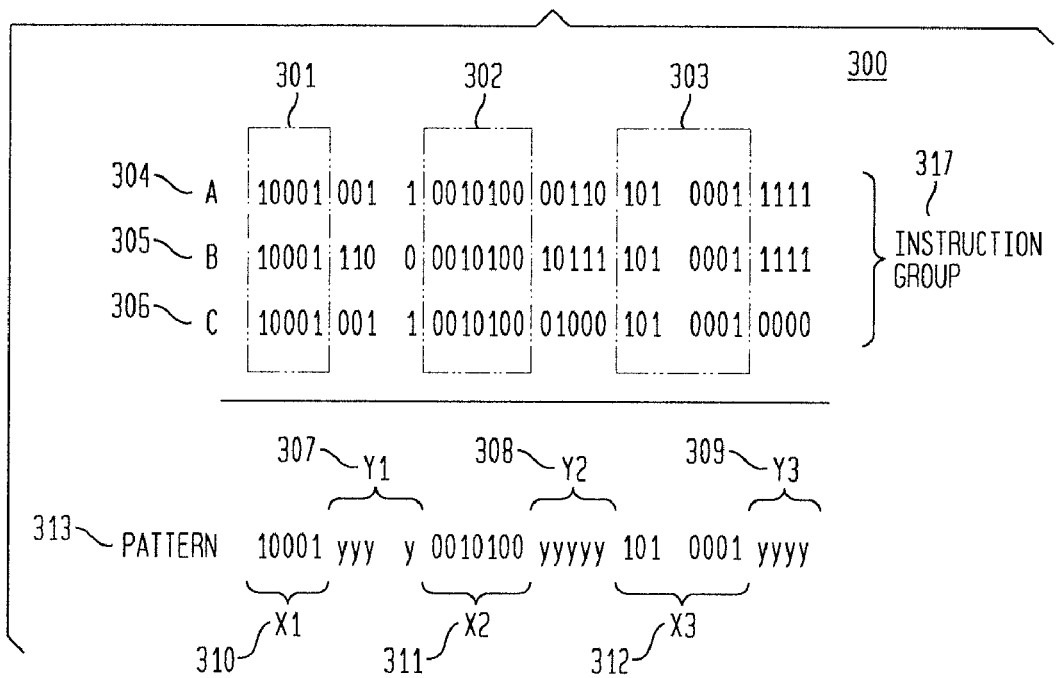
FIG. 3A illustrates an exemplary x and y bit group partition.
Figure 3B:
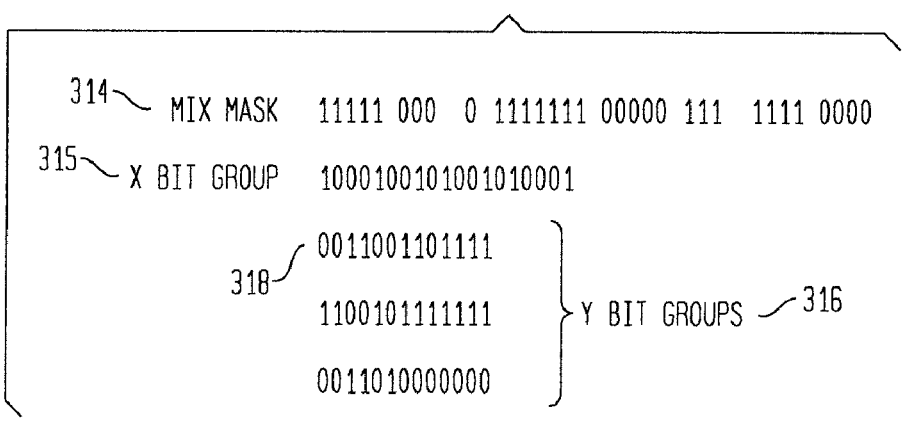
FIG. 3B illustrates component bit vectors for an exemplary instruction group.

The basic actions and assumptions which allow the definition of tradeoffs involved in the invention are addressed below. As mentioned above, the code segment input into the analyzing phase is first scheduled and optimized for execution performance. Partitioning of the original code segment (CS) into sections creates groups of instructions. Each group has one or in some implementations more patterns associated with it. FIG. 3A illustrates an exemplary pattern for a group 317 of three instructions A304, B305 and C306 where bit groups 301, 302 and 303 common to all three instructions are preserved at bits X1 310, X2 311 and X3 312 in a resulting pattern 313 while changing bit groups are replaced with place holders Y1 307, Y2 308 and Y3 309. As shown in FIG. 3B, each pattern is defined by two bit vectors—a mix mask (MM) 314 and an x bit group 315 of x bits. The pattern 313 defines the format of the instruction group 317 and a y bit group 316 of y bits define all instances of that format—for each of the individual instructions 304, 305, 306 in the group. Sizes of x/y bit groups vary, but their sum is always equal to the original instruction size. An exemplary implementation on a ManArray architecture with an instruction size of 32 bits is used throughout this discussion; however, it will be recognized that various ones of the present inventive techniques may be adapted to other architectures.

The actual subdivision process is further illustrated in FIG. 4. This example was obtained from an implementation of an MPEG4 application on the Manta 2×2 ManArray architecture. FIG. 4 illustrates a real group formed for a load instruction (LD) 403. Digit '270' 401 is the sequential number of the group among others, while entry 402 is the static frequency of the LD instruction in the application under consideration. Pattern 404 is the pattern obtained from the analysis of this group. Mix mask 405 is the MM for this group. Columns 407 and 408 illustrate x and y bit groups for each instruction 406 in the group. Indices 409 are offsets of x/y bit groups in a list of all x/y bit groups. Each of the bit groups is entered into a corresponding dictionary, an X/Y dictionary which forms a translation table (TT). During the initialization of the abbreviated application, the translation table is loaded into a hardware memory structure called a translation memory (TM), such as TM 210.

Figure 5:
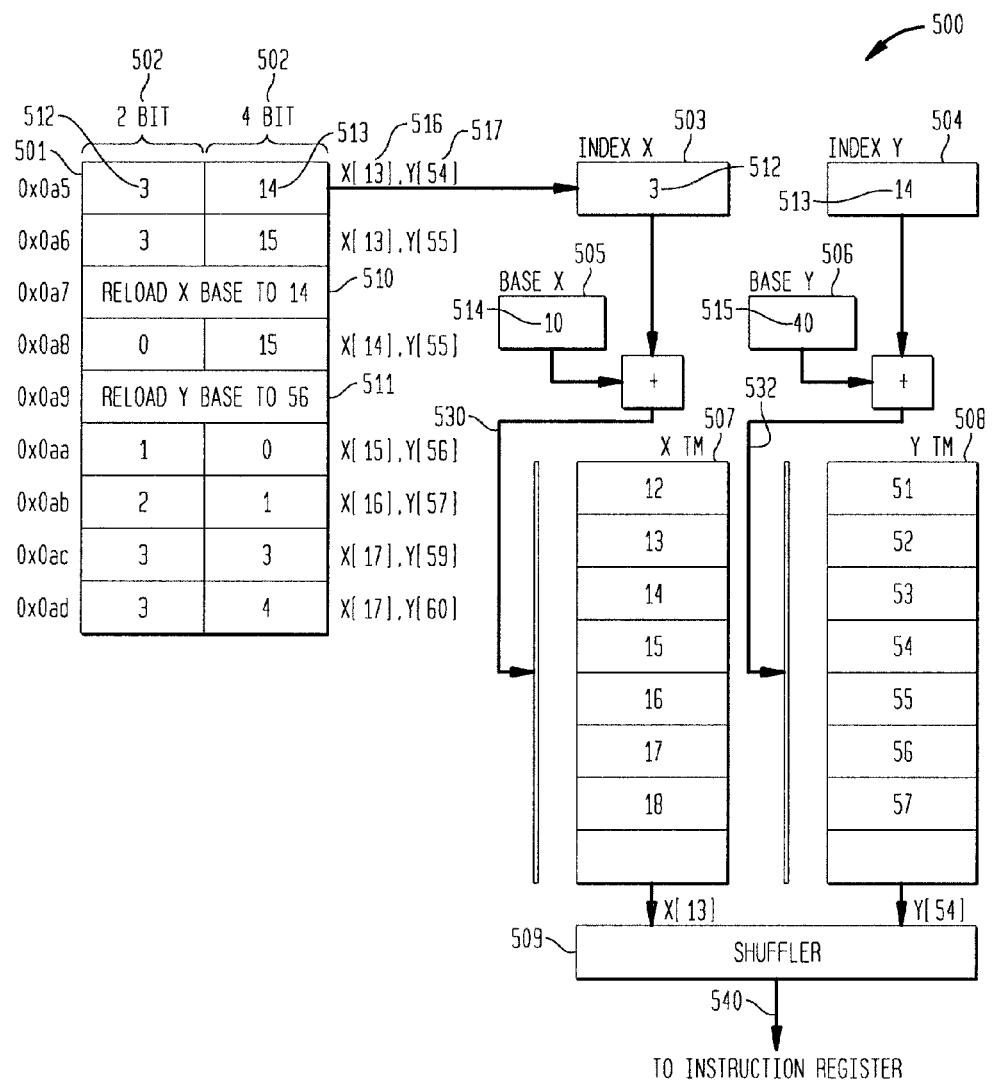
FIG. 5 illustrates an abbreviated instruction decoding process constrained by an index budget.

FIG. 5 shows an abbreviated instruction decoding process 500 illustrated utilizing a group of abbreviated instructions 501 and an exemplary decoding process using a translation memory, 507 and 508. Each instruction of the original application is replaced with a pair of indices, one referencing an X-TM memory 516 see FIG. 5, and the other referencing a Y-TM memory 517. Each X/Y TM index pair can be normally packed into less then 32 bits, which creates a compression effect for the original application. The X/Y TM indices themselves could also be replaced with offsets 512, 513 using some budget 502 from base addresses 514, 515, which are stored in base address registers (BR) 505, 506. There is at least one BR for X-TM, such as XBR 505 and at least one BR for Y-TM, such as YBR 506. The X/Y TM indices 516, 517 are obtained by adding the current content of the corresponding BR 514, 515 with the corresponding offset 512, 513 to create X-TM address 530 and Y-TM address 532. The X-TM addressed entries 530 and the Y-TM addressed entries 532 are combined in shuffler 509 based on the generated mask to create instructions 540 suitable for execution on the core processor. This mechanism allows for the periodic reloading of the X/Y BR 505, 506 contents 514, 515. Options for reloading the BR include:

Introducing a new reload instruction or extending the target address space for an existing load-immediate instruction, and inserting it into the program, as shown for program subset 501, at the locations 510, 511 where a reload is needed. It is noted that this method has a potential need for remapping of branch targets since the process is taking place after the binary images have been generated. This remapping may potentially affect the program's performance.

Implicitly loading the base register 505, 506 at predetermined program addresses as specified by the program counter (PC) value. This method does not introduce additional instructions into the program's binary image but requires a content-addressable memory to indicate when a matching address is reached. It is noted in this case that the content addressable memory may be large.

The former method using a reload instruction is a presently preferred embodiment of the invention and is addressed throughout the remainder of the discussion.

Figure 6:
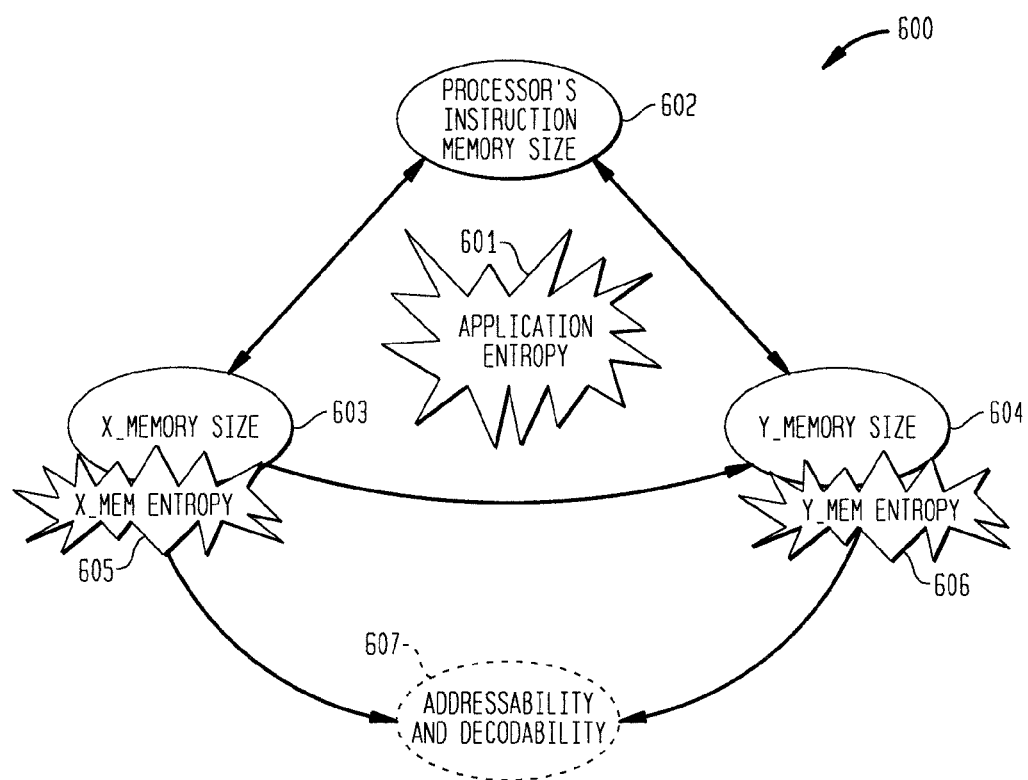
FIG. 6 illustrates a tradeoff space in statistical analysis of the code segment (CS) and hardware implementation of the decoding hardware.

The overall tradeoff analysis 600 is illustrated in FIG. 6. With the above-mentioned method of replacing X/Y TM indices with an offset, the original set of instructions could be encoded with any specified number of bits, in other words, any budget which is greater then zero. The basic encoding limitation is the information entropy 601 of the original application. If the original application entropy is initially high, no abbreviation or compression will gain any size reduction and no abbreviation or compression is needed. Nevertheless, it should be recognized that the entropy of the code produced by the majority of existing compilers, as well as human programmers, is very low and unique for each application. This phenomenon is due to the discrete nature of the majority of existing ISAs which have to be suitable for a generic application, and are not specifically optimized or otherwise adapted for each specific application.

The number of bits given to encode X/Y TM indices (budget—as governed by the size of the offset) directly correlates to the width of a processor's instruction memory, such as memory 602. The total number of instructions in an abbreviated code segment is greater than or equal to the number of instructions in the original code segment. If there is a difference between the number of instructions in the original and abbreviated instruction segment, it is due to the overhead needed to guarantee addressability and decodability of the abbreviated instruction set, for instance the number of BR reloads needed. The X/Y indices budget size tradeoff manifests itself in the following: the larger the budget is—the smaller the number of times X/Y BR have to be reloaded is.

This relationship means that the smaller the number of reload instructions (less static overhead) and the smaller the number of dynamic invocations of those reload instructions (less dynamic overhead), the larger the size of the processor's code segment.

Another tradeoff is related to the organization of the internal translation table storage—X/Y TM. This tradeoff includes a size balance between the X and Y portions of the TM 603, 604, X and Y internal informational entropy 605, 606 and the addressability of X and Y memories 607. According to the encoding model described above, in order to recreate an original instruction from the content of the X/Y TM, several actions have to be performed. For each abbreviated instruction, the TM must provide three separate entities: an X bit group bit pattern 315, a Y bit group bit pattern 318, and the mix mask (MM) 314. The tradeoff is: the higher the X/Y TM content entropy is, the smaller the X/Y TM memory that is needed for a specific application. Alternatively, a larger program could be fit into a smaller fixed size storage. At the same time, for all the considered implementations, larger X/Y TT indices are required for the abbreviated instruction or a considerably more complex addressing mode for accessing the X/Y TMs would be required. For example, larger X/Y TT indices require more BR reloads with a fixed indices budget and a larger processor code segment. In a similar way, the higher the X/Y TM entropy is—the more complex the addressing mode that is needed to access X/Y memory content. An example of this increase in the complexity of the addressing mode might be easily illustrated with a simple observation. Given variable length TM entries, by aligning them on word boundaries, the simplest base offset addressing could be used. But, then padding to word boundaries is needed, so the entropy of the X/Y TM is low. On the other hand, multiple TM entries can be allowed to "share" an addressable word entry in X/Y TM memory, but then addressing must discriminate between them, so it becomes more complex, while entropy of the content increases. Here, it is important to understand the difference between addressing smaller units inside TM (bytes vs. words) and increasing addressing complexity (using various modes and fixed offsets for instance). This tradeoff is discussed in greater detail below. On the other hand, a more complex addressing scheme would require smaller X/Y indices. The size balance between the X and Y-TM size could have effect on this tradeoff as well, but in a less obvious fashion.

The last limiting factor related to addressability of the X/Y TM is combining the three entities (X bit group, Y bit group and MM) back into the original (32-bit) instruction. This factor might have a prohibitive effect on implementation of some options.

Decoding Options

The decoding process directly correlates to the method used to define the MM and x/y bit groups. There are two general approaches to implementation of this definition: fixed mask generation (FM) and variable mask generation (VMG). The FM approach was used in U.S. application Ser. No. 09/422,015 and specifies a limited number of human suggested masks generally independent of the application under consideration. The VMG method is newly proposed by the present invention and it includes an optimal and unique automatic mask generation method for each application.

The decoding problem definition in case of the VMG is as follows: there are two bit arrays of variable length, such as x bit group 315 and y bit group 318 and one 32 bit MM, such as MM 314, which sets the order in which the two variable bit arrays such as arrays 315, 318 should be combined to recreate an original instruction, such as instruction 304. The number of MMs is fixed for each application and remains unchanged throughout application execution, but it could be changed between application invocations to possibly reflect changes in usage of the application. Nevertheless, it should be recognized that such changes are not likely and will typically only occur if a significant portion of the original application has been redefined.

The VMG decoding process could be implemented in several ways, three of which are considered here and illustrated in FIGS. 7A, 7B, 8 and 9. A device which performs this function is referred to herein as a shuffler.

Figure 7A:
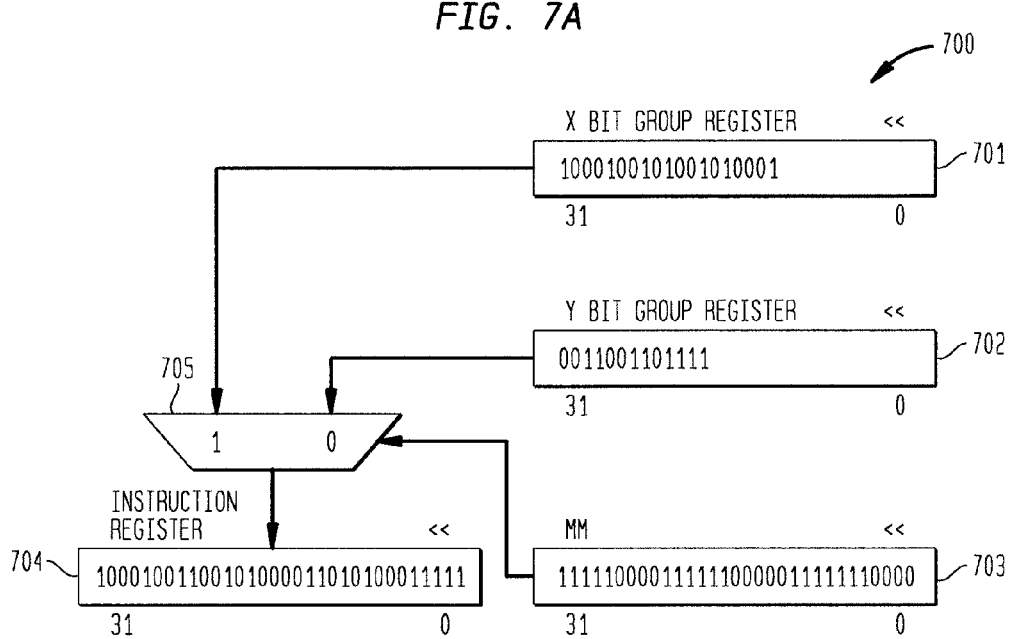
FIG. 7A illustrates a sequential implementation of a shuffler using four shift registers and one bit shifting.

FIG. 7A shows a first sequential implementation shuffler 700 with four shift registers 701, 702, 703 and 704. All registers are 32 bits wide. Register 704 holds a translated instruction in its original uncompressed form. Register 703 holds a 32 bit MM, and both register 701 and register 702 are utilized to account for the worst case scenario, when only one bit group is used to encode the original instruction. At the first cycle, a multiplexer 705 passes one bit from x bit group register 701 if the current MSB of the MM register 703 is equal to one, and one bit from the y bit group register 702 otherwise. At the end of the cycle, all registers are shifted left by one and the process is repeated. This implementation takes multiple cycles to complete. For 32 bit encoding and one bit shift, the number of cycles to do the translation is 32. This multiple cycle operation is the biggest limiting factor for implementation of this approach. Since instruction recreation should take place in the decoding stage of the DSP processor pipeline, multi-cycle implementations are likely to be impractical. Nevertheless, this approach takes a small amount of hardware to implement, and combined with different shuffling methods and performed on a bigger portion of the input bit-vectors in parallel, this method could be appropriately used for certain applications.

Figure 7B:
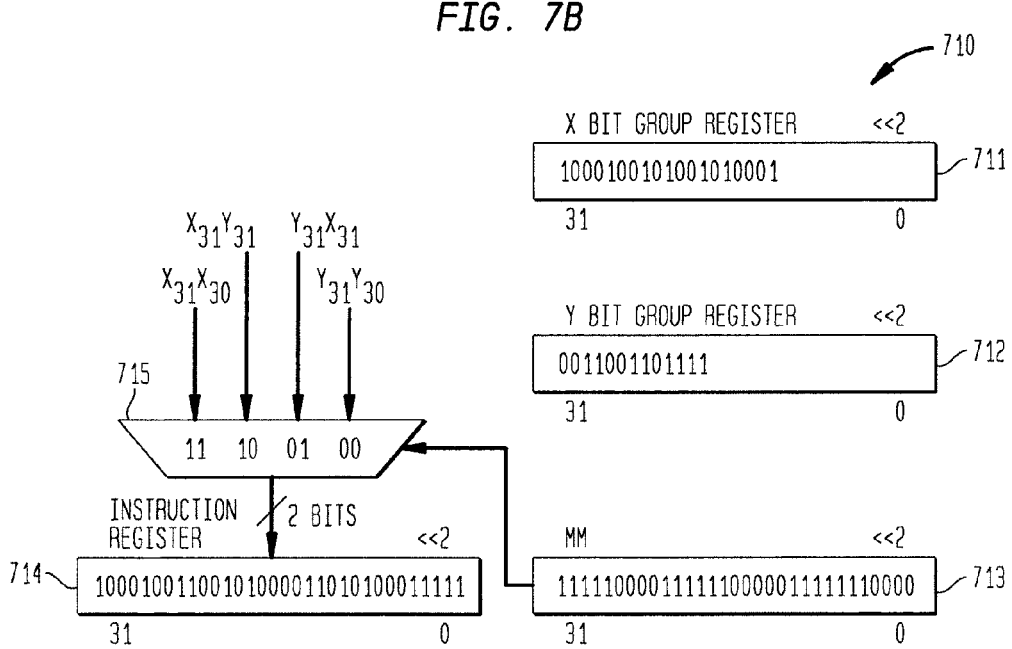
FIG. 7B illustrates an alternative sequential implementation of a shuffler implementing two bit shifting.

For example, if two bits are shifted at a time as in shuffler 710 of FIG. 7B which employs two bit shift registers 711, 712,713,714, and a four-to-one 2 bit-wide multiplexer 715, 16 cycle latency can be easily achieved. Similarly, a three bit shift register and an eight-to-one 3 bit-wide multiplexer will yield an 8 cycle latency, and so on until the desired balance between latency and hardware size is achieved.

FIG. 8 presents a fully parallel implementation of a shuffler 800 using a set of multiplexers 809. The first multiplexer (1 bit wide, 2 to 1) 806 has only two inputs from the MSB of both x and y bit registers 801 and 802. The sizes of all the registers in the FIG. 8 shuffler 800 are the same as those in the previously discussed shufflers 700 and 710. The next multiplexer (1 bit wide, 4 to 1) 810 has the same inputs as the previous multiplexer 806 plus two more inputs from bits 30 of both x and y bit group registers 801 and 802. The same is true for all consecutive multiplexers in the group 809. Finally, the last multiplexer 807 is a 1 bit wide 64 to 1 unit, and it has inputs from all 32 bits of both the x and y bit group registers 801 and 802. Each multiplexer is controlled by a priority decoder 805. The critical path in this implementation is the priority decoder 805 followed by the 64 to 1 multiplexer 807. The biggest tradeoff in this design is the amount of hardware needed. There is a way to increase utilization of the physical lines within the shuffler and multiplexer utilization. In the design shown for shuffler 800, the number of lines used for connectivity versus the number of lines actually used for selection is high. The approach described immediately below does not share this inefficiency.

Figure 9:
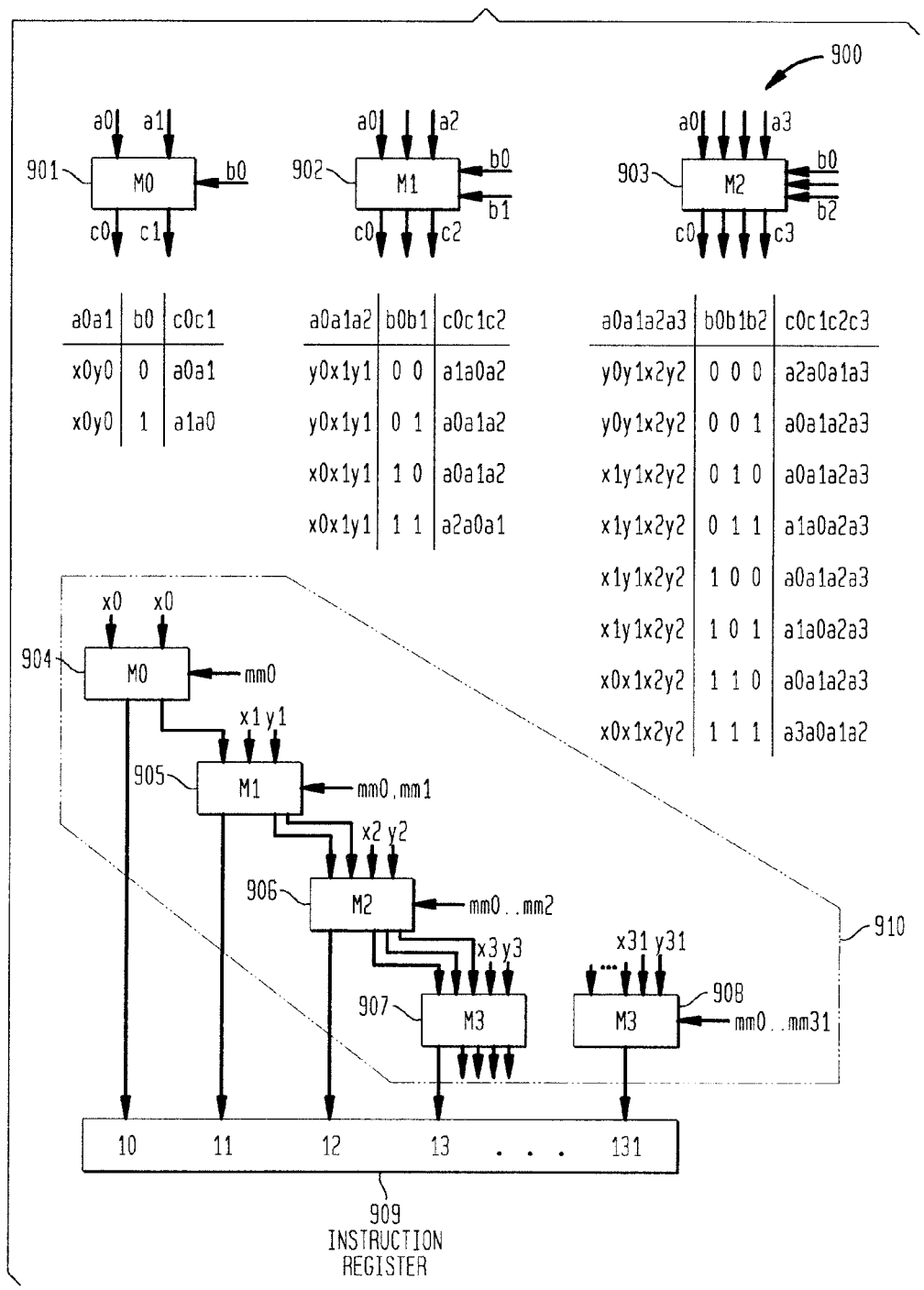
FIG. 9 illustrates an implementation of a shuffler using a combined cell.

A third implementation of the VMG shuffler has a priority decoder combined with multiplexer tree logic. Several cells of a design for such a shuffler 900 with the truth tables 901, 902 and 903 are shown in FIG. 9. A multiplexing tree 910 includes 32 cells. The top cell 904 has two inputs and two outputs. The largest or bottom cell 908 has 32 inputs and 1 output. The logical complexity of this element 908 is less than the combined logical complexity of the 64 to 1 multiplexer plus the corresponding priority decoder tree. The appropriateness of this latter implementation depends upon the propagation delay from cell 904 to cell 908.

Depending on the system requirements, one of the above described approaches as well as a combination of these approaches, or a yet further approach could be used for shuffling. It also should be recognized that if any of the described approaches would impose critical requirements on the implementation of the present invention, there is always the possibility of utilizing fixed mix masks (FM) for a class of applications, see, for example, implementation 1000 of FIG. 10.

Figure 10:
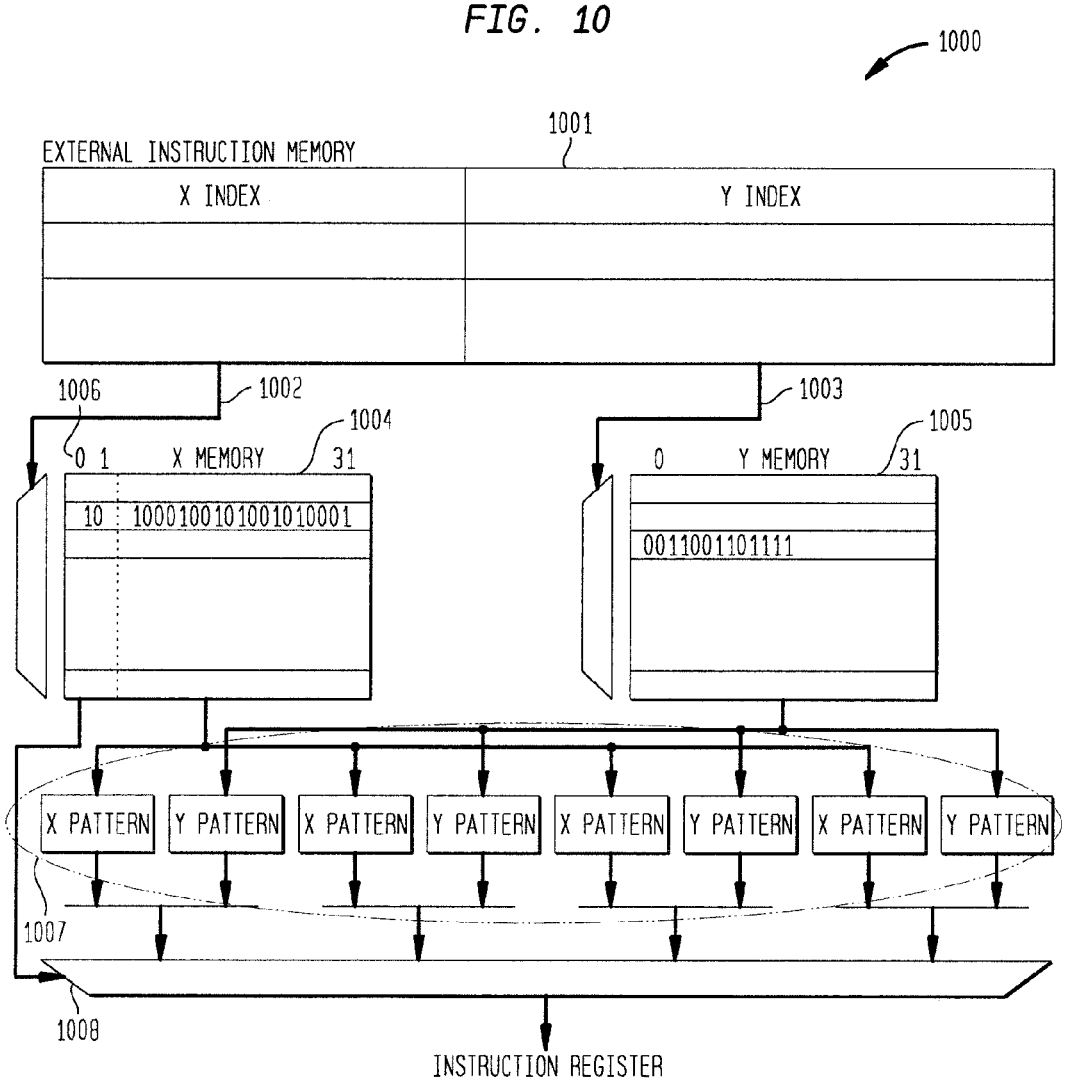
FIG. 10 illustrates an implementation of a shuffler in a fixed mask system.

In the exemplary implementation 1000, a set of four fixed masks is used, so instead of a multiplexing tree as in FIG. 9, a hardwired shuffler could be satisfactorily used. In FIG. 10, instruction memory 101 holds a pair of indices into the X/Y TM 1004, 1005. BR is not shown for purposes of keeping the illustrative example simple. The X-TM has a two-bit field 1006 associated with each entry. This field holds a selector into a 32 bit wide four to one multiplexer 1008 which selects one of the hardwired paths 1007 of all four possible masks used for this class of applications. For a programmable DSP, these masks are generated based on the analysis of the set of applications thought to be implemented on the processor. For a fixed function DSP, a configuration using 8 masks is a presently preferred implementation. This approach utilizes a three-bit field for multiplexer control. Lastly, blocks 1007 could be implemented with reconfigurable logic, which allows a user to change them once, when a new application is loaded to the system and then to reuse them throughout application execution without further modification.

Organization of the X-TM and the Y-TM

Figure 11:
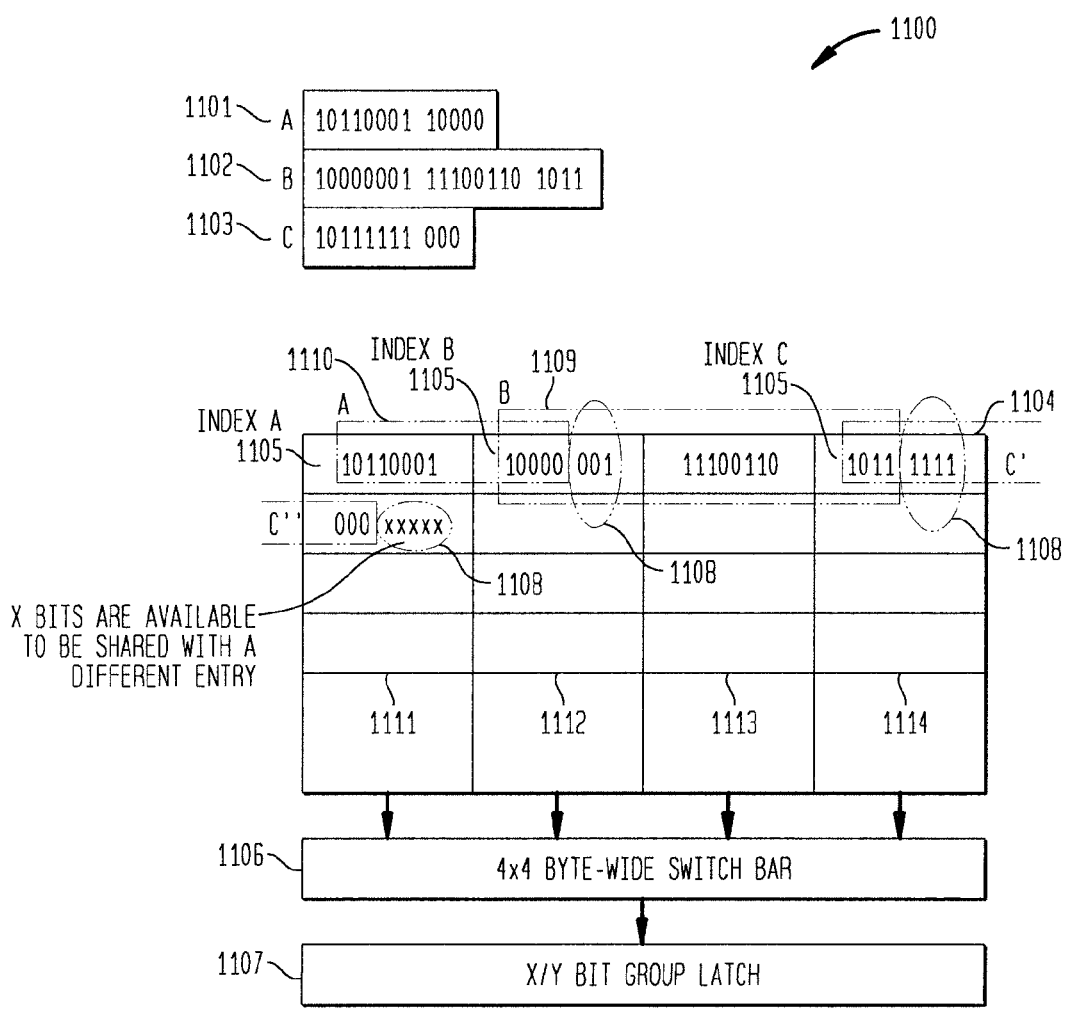
FIG. 11 provides an exemplary mapping of multiple entries into translation memory (TM) with overlapping allowed.

One of the above-mentioned tradeoffs deals with the addressability and internal entropy of the X/Y translation memories 605, 606 of FIG. 6. The main instance of this tradeoff is access alignment of the X/Y TM 1104 as shown in FIG. 11. If X/Y TMs are 32-bit word addressable, each of the x/y bit groups is guaranteed to fit inside the word. By definition, the x/y bit group is less than or equal to the instruction width which is 32 bits in the ManArray architecture. The tradeoff is easily illustrated with the difference in addressable contents with fixed address size but variable content width. For example, if the smallest addressable entity in the memory is a 32-bit word, four times more memory space is addressed as compared to when a byte is the smallest addressable entity. At the same time, data placement granularity varies accordingly. The smaller the addressable entity, the higher will be the density of the data due to achieving a better fit of the data to the entity width with minimum padding. Further, with byte addressable memory, multiple entries could be mapped into the same memory location. What is meant by that is that logically separate entries could share physical storage cells. FIG. 11 illustrates an exemplary byte addressable X-TM 1104 with overlapping entries permitted. In FIG. 11, entry A 1101, entry B 1102 and entry C 1103 present three separate entries from X TT which have to be mapped into X-TM with minimization for X-TM size. Since the shuffler is capable of discriminating the end of an x/y bit group from the MM, it is possible to reuse the fragmented portion of a partially occupied byte of X-TM memory 1108 to allocate another entry from X/Y TT which has the same beginning as the byte that occupies the upper portion of the TM cell. In FIG. 11, the placed group B 1109 reuses bits '10000' which belong to group A 1110 by concatenating them with bits '001'. To guarantee the correct fetching of any of the X TT entries, a switch bar 1106 is used. The fetching is performed in the following steps:

If X-TM is indexed with an address of byte 0 in a line (a byte from column 1111 for example) the whole line is read.

If X-TM is indexed with an address of any consecutive byte (1112, 1113 or 1114), the rest of this line is read plus the beginning of the next line (wrap around read). In this way, four bytes are always read from the TM.

The byte wide 4×4 switch bar 1106 is used to reassemble 4 bytes back into a 32-bit word. The desired TT entry is guaranteed to be within this word.

Another implication of this placement method is the ability to use a single physical memory array with dual port access, as opposed to two separate memories. This storage approach should increase flexibility in placement of X and Y-TM portions and allows this storage to be reused for something besides compression. One advantageous reuse of this storage is an instruction cache-like structure to hold uncompressed (non-abbreviated) instructions.

This mapping approach can be utilized to achieve high density and reuse of X/Y TM. In other words, the content of X/Y TM memory has very high entropy. Nevertheless, this placement complicates the optimization for minimizing dynamic overhead from BR reload since it requires organizing the X/Y TM contents in specific orders. The judgment should be made in favor of the desired optimization. If some dynamic overhead could be tolerated, this X/Y TT to X/Y TM mapping is appropriate.

Figure 12:
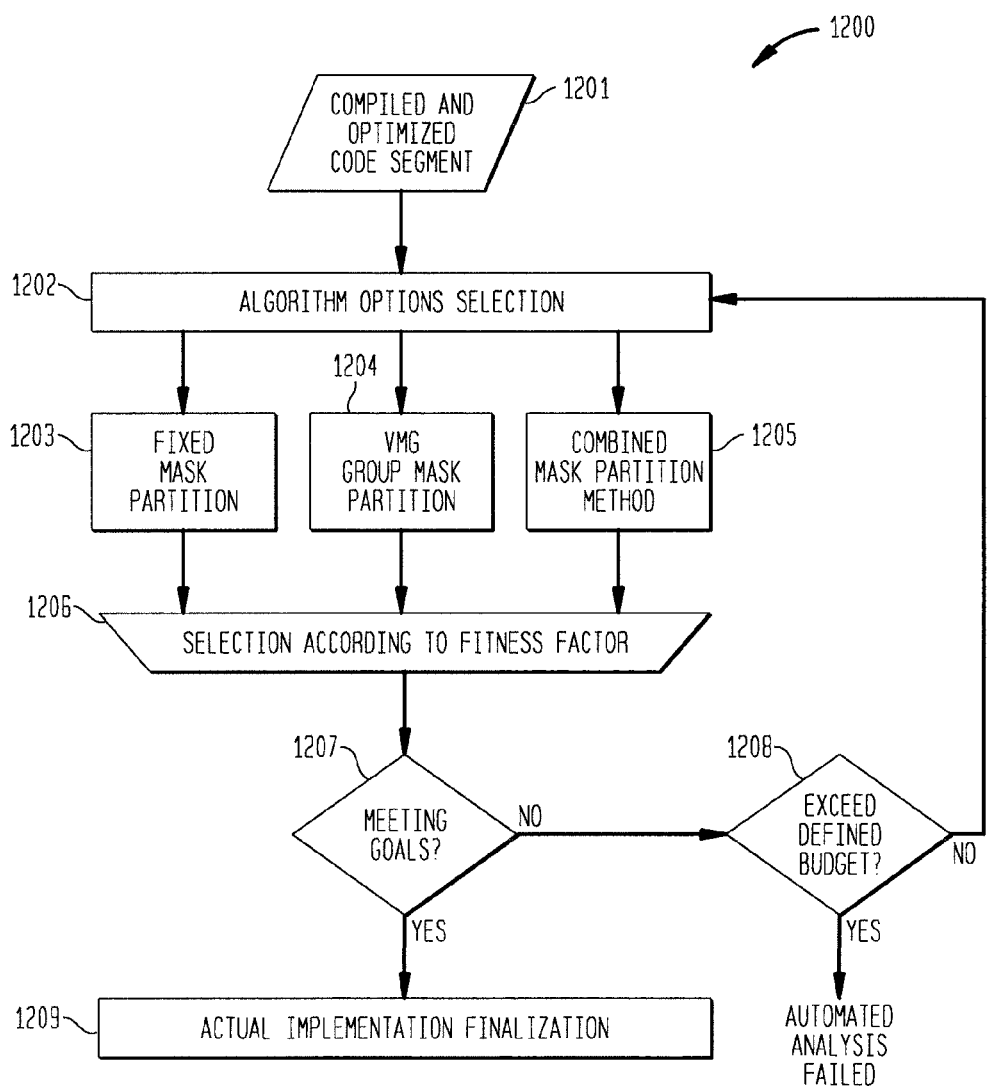
FIG. 12 is a high-level flowchart for statistical analysis of the CS.

There are multiple strategies, see steps 1203, 1204 and 1205 of process 1200 of FIG. 12, for example, for performing the automated analysis of the present invention. These strategies are not mutually exclusive. For example, multiple independent analyses can be performed in parallel resulting in a subsequent step 1206 of choosing a best configuration from amongst these analyses. The following is a detailed description of a process 1300 for performing the variable group mask partitioning step 1204.

Figure 13:
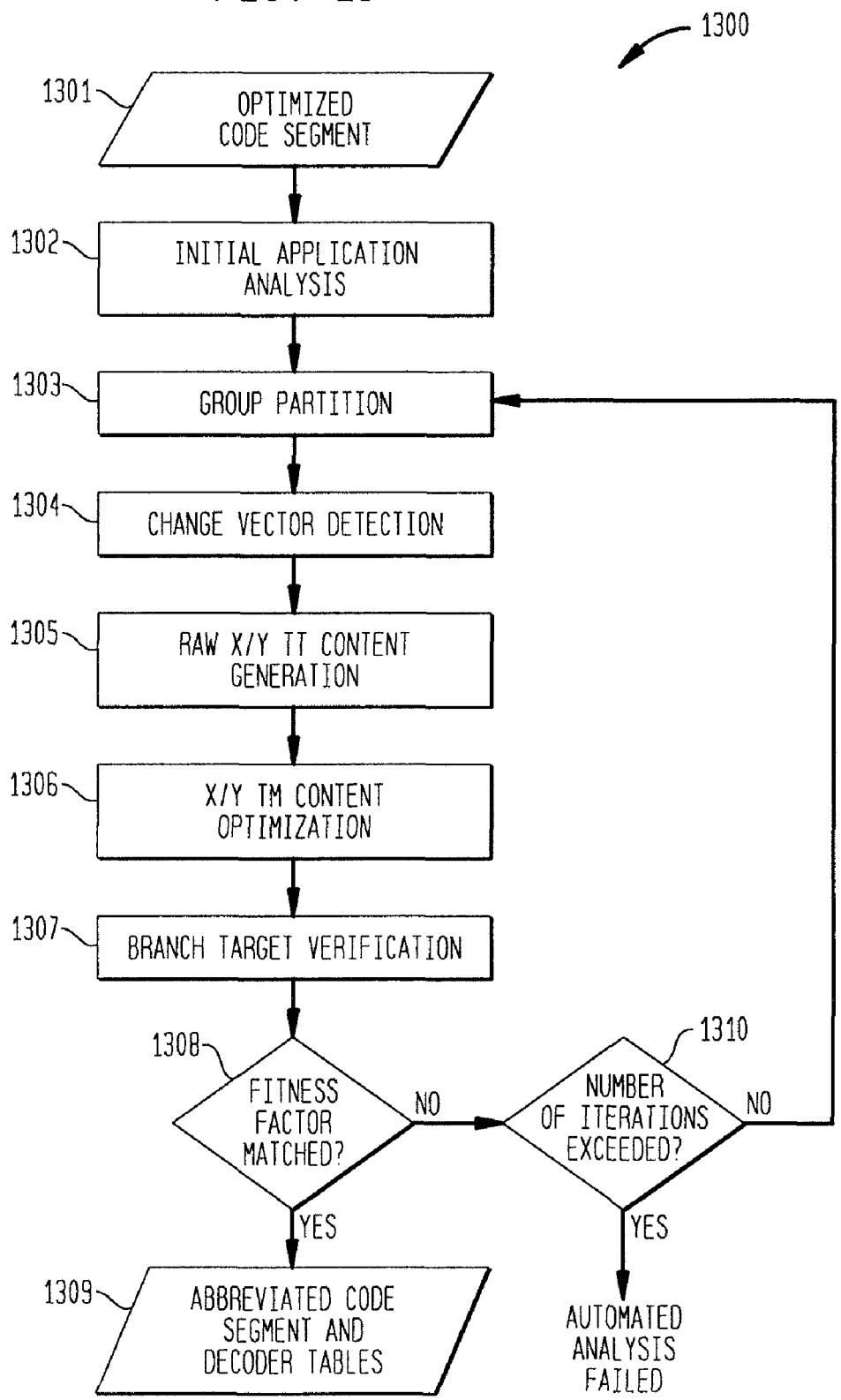
FIG. 13 illustrates a detailed flow for the statistical analysis of the CS.

Process 1300 shown in FIG. 13 begins with an optimized code segment in step 1301. In step 1302 of the optimization/abbreviation process 1300, a statistical analysis of the optimized code segment (CS) 1301 is made with individual (32-bit) instructions accepted as atomic entities. It is noted that all the unique instructions in the CS comprise the input alphabet. Results of the analysis preferably include the following: the number of total instructions used, number of unique instructions used, and number of different instruction types used. In this instance, instruction types will be used for CS partitioning into groups (as described above), so the term types is used in a generic sense. Instruction types could, but need not necessarily, follow operation types as specified in the original ISA definition. Additional results may preferably include the number and frequency of individual registers used, and the number and frequency of literal (constant) fields that are used. Also, in step 1302, the dynamic execution frequency of all instructions should be obtained. If not provided from an outside source, the code could be run on a system simulator with an exemplary set of input data and the execution frequency of each instruction recorded. It should be recognized that the majority of compilers use this information in code generation, so it is likely to be readily available.

In step 1303, the initial set of instructions is partitioned into groups. A first partition is done according to a default heuristic—one group for each instruction operation code (OPC). Using binary analysis, each group is analyzed to determine the fixed versus changing part in step 1304—the change vector (later to become MM). An example of this analysis is described above in connection with FIG. 4. In the analyzed application, a Load (LD) instruction was statically used 120 times. This usage is not to be confused with the dynamic profile weight of the same instruction. The bit patterns of the example yield the change vector 401. It should be recognized that the initial group partitioning is extremely sensitive for defining a balance between the number of entries in X-TM and Y-TM, as well as many other tradeoffs which are involved in the analysis. Various implications of this partitioning will be discussed shortly below.

In step 1305, X-TT and Y-TT contents are defined. The first step here is to optimize the X and Y tables obtained as a result of steps 1303 and 1304. Obviously, multiple entries are repeated inside each of the tables. More than that, partial bit patterns could be found and matched to each other such as, for example, patterns 1109, 1110. This may be done by a simple binary vector analysis within the X and Y tables. At the end of this step, the actual contents of X TT and Y TT are defined. It should be noted that according to the addressability versus X/Y TT size tradeoff, this step could vary greatly.

In step 1306, the X/Y TM layout is defined. This function is performed first by initial assignment of indices. Rather than just placing the TT into TM, the layout could be optimized for a dynamic access pattern. It should be recognized that static analysis of the application does not reflect the reality of the dynamic execution of the same program and dynamic execution weight profile information should be utilized in the analysis. For example, an X-TM/Y-TM BR reload instruction could multiply in number if a small index budget is assigned and ultimately might cause the number of original instructions to be greatly exceeded. Even if this extreme is not reached, some reload instructions might be inserted into a frequently executed region of the program possibly reducing the performance of the application. An analysis could be conducted to minimize such occurrences. The idea behind this analysis is that if two entries within each of the tables (X/Y) are swapped, it does not affect the code size, but it does change the location of the inserted base reload instructions. By minimizing the number of reload instructions in a frequently executed region of the program, the total dynamic impact of the abbreviation process is minimized. A base reload happens when the number of index budget bits given for instruction encoding is less than the combined size of indices into the X-TM/Y-TM memories.

Figure 14:
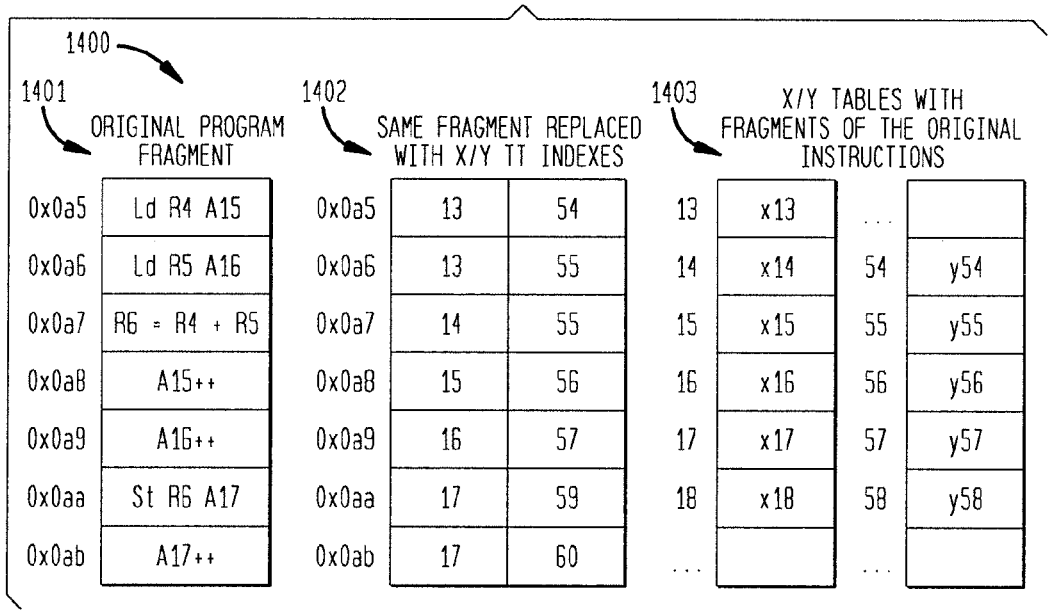
FIG. 14 illustrates a representation of an original program fragment with indices into a translation table (TT) and its mapping into TM.
Figure 15:
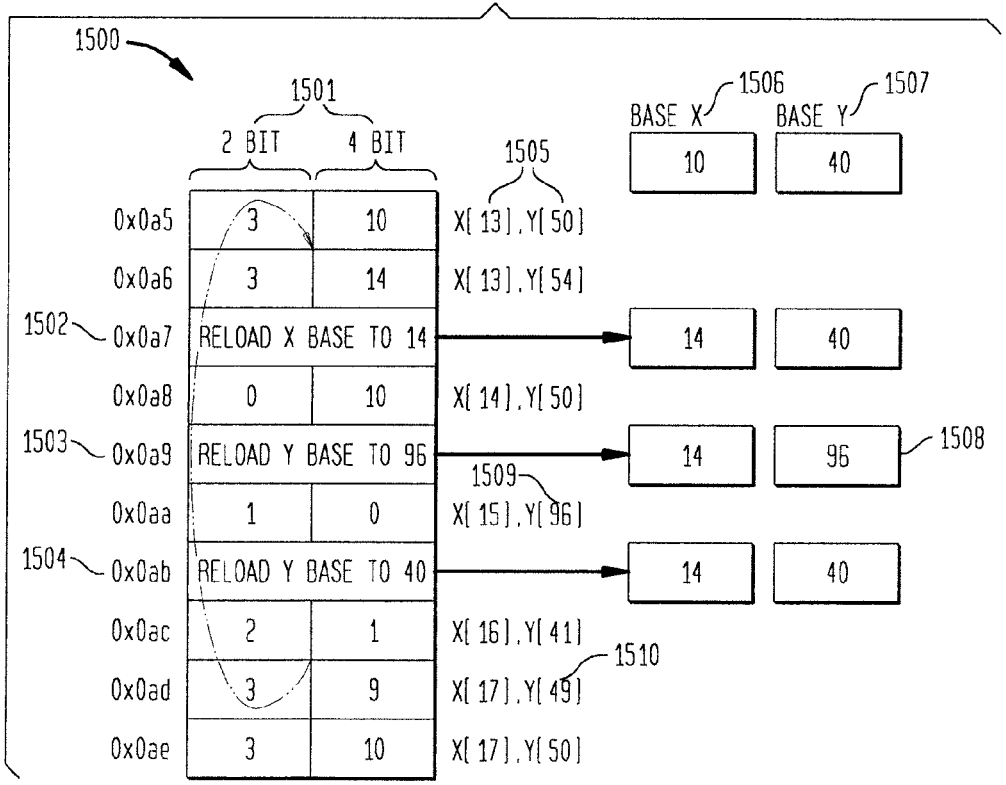
FIG. 15 illustrates a high overhead base register (BR) reload instruction placement in a highly executed code fragment.

For the exemplary representation 1400 for an original program fragment shown in FIG. 14, the original program fragment 1401 gets replaced with a set of indices 1402 into X/Y tables 1403. For simplicity, in this example it is assumed that no packing was performed in mapping of TT into TM. The maximum number of entries in each table dictates the maximum number of index bits needed to address any entry in this table. Nevertheless, as can be seen in FIG. 5 and FIG. 15, the index budget 502 and 1501 could be significantly smaller then the number of bits needed, so reload instructions, such as instructions 1502, 1503 and 1504 should be inserted. In certain cases, the random insertion of those reload instructions might yield sub optimal run time performance. For instance, as can be seen in FIG. 15, Y BR 1508 has to be reloaded for a single instruction only, creating two instances 1503 and 1504 of the reload instruction in a potentially heavily executed region of the code. If the corresponding entry #96 1509 in the Y TT could be switched with any entry in the range between 40 and 56, the #49 entry 1510 for example, outside of the potentially highly-executable region, then the pair of reloads 1503 and 1504 will not be necessary. Optimized index assignment 1306 is preferably performed in two steps.

First, instructions are grouped in threads—groups of instructions of equal (or similar) dynamic weight—according to their execution frequencies. This mechanism attempts to determine contiguous regions with similar execution frequencies (normally loops) and assign contiguous indices streams to them. After the threads are determined, they are sorted in descending weight order and indices are assigned sequentially in each thread.

Second, an optimization of the initial assignment is performed. For a fixed number of iterations the indices that are causing BR reload instructions with the highest weight are swapped with their counterparts of a lower weight, as previously discussed in connection with the earlier examples of FIGS. 14 and 15.

If needed by the instruction memory architecture, the branch target addresses are recalculated according to the new program layout in step 1307. This remapping is only needed if BR reload instructions were introduced at the previous step. It also should be noted now that it is very reasonable to set the index budget to be a multiple of the smallest addressable entity in the instruction memory—byte, half word or word. In the current invention the presently preferred implementation is to use a half-word (16 bit) budget for the X/Y index pair. This approach allows for both original and compressed instructions to coexist in the same instruction memory—either a single 32-bit uncompressed instruction or a pair of abbreviated ones. Control over compressed versus uncompressed mode can be achieved by writing a control bit into a Special Purpose Register, which controls this function, or through control bits added to an abbreviated instruction encoding. Nevertheless, it is not a requirement for the present implementation. Once the X/Y TM content has been defined and indices assigned, branch targets could be recalculated and replaced. If for some reason a remapping would not be possible due to limited space for recalculated addresses, the index assignment could be repeated with certain restrictions, the index budget could be increased or multiple hop branches introduced. It should also be mentioned that such a situation has not been encountered in any of the considered examples.

In step 1308, verification of correctness is performed, and if certain criteria, such as the number of introduced BR reloads are considered, the process of index assignment is reiterated back to the group partition step 1303 until a stable state with the minimum numbers of BR reloads is achieved or a maximum number of iterations is exceeded in step 1310. Next, the whole process 1300 is repeated with a different instruction grouping strategy, such as one of strategies 1203 or 1205. The next grouping strategy to try might be, for example, partitioning according to the functional grouping. For example, in ManArray, the functional units would be the Store, Load, ALU, MAU, DSU units addressed above in connection with the discussion of FIG. 1 and the CS would be partitioned accordingly. This partition greatly affects the effectiveness of the whole process and could be further diversified.

Another grouping strategy might be based on the program's use of instructions such as grouping instructions by dynamic usage characteristics, as a means to minimize dynamic reloading of the TM BRs. For example, all instructions can be grouped by frequency of use by defining usage ranges per group. Other grouping strategies may be more complex, combining multiple simpler strategies in order to optimize a group strategy best suited for the specific application code segment being abbreviated.

Finally, using the best grouping strategy, the original 32-bit instructions are replaced according to meeting the Fitness Factor 1206 with pairs of optimized indices into X-TM and Y-TM and the contents of X/Y memories 1209 are finalized.

Program Loading

Upon loading the program into the memory, two separate actions are taking place. If a low volume DSP production or reconfigurable solution is considered, the loading program first fills the contents of X-TM and Y-TM with optimized X and Y tables. These tables are local to the processor core and are not present in the processor's instruction memory. If a high volume production is assumed, X-TM and Y-TM could be implemented as ROM and built into the DSP core. The second loading action is the traditional placement of the code segment into the processor's instruction memory. Now effectively the original code segment is partitioned between X-TM/Y-TM and processor's instruction memory in a very efficient way. The high entropy or near zero duplication data reside closer to the fetch logic of the DSP core, and a shortened, but repetitive set of indices resembling the original application reside in the processor's instruction memory.

Figure 16:
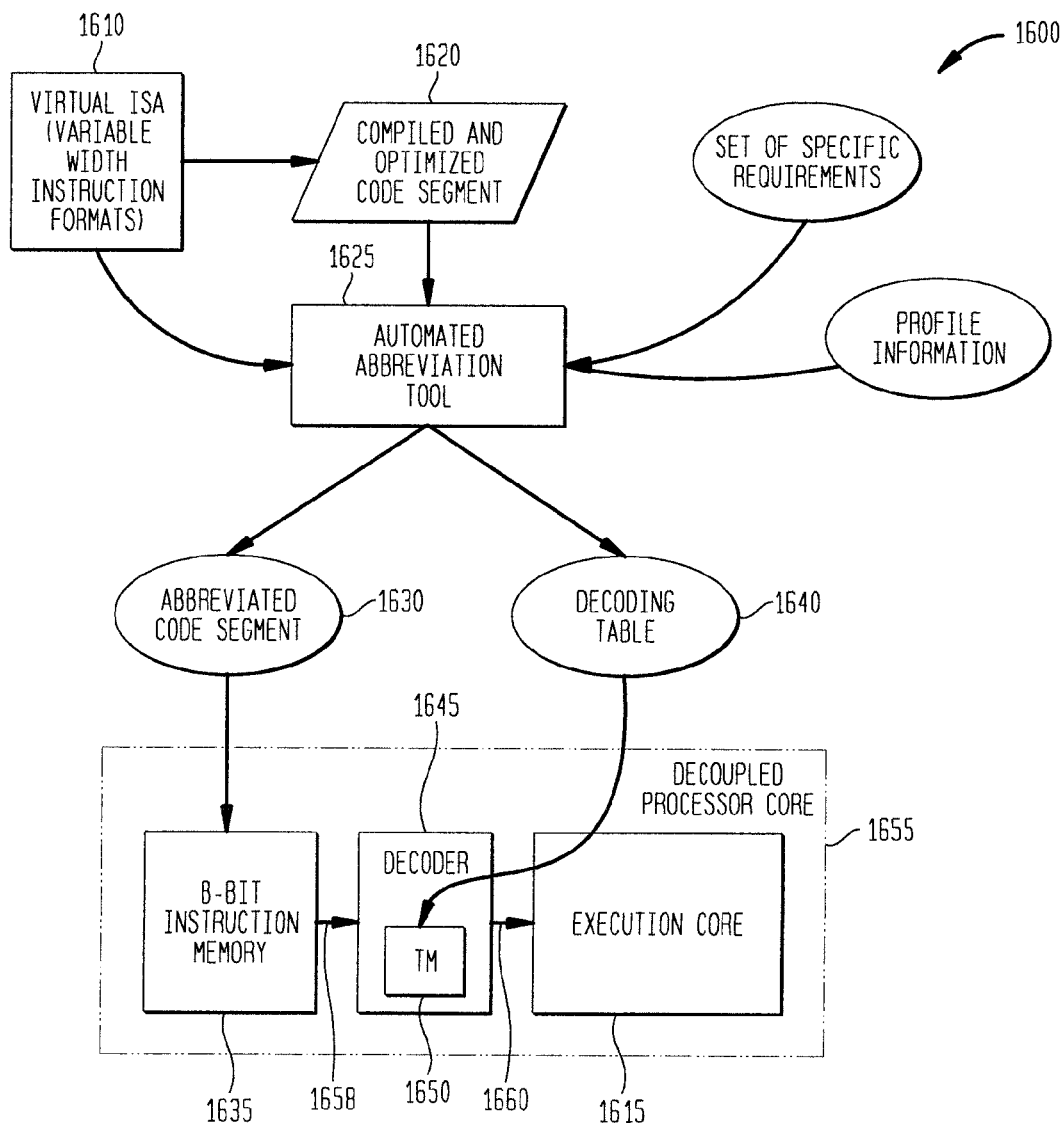
FIG. 16 illustrates a general system and process for a decoupled processor using instruction abbreviation as the decoupling mechanism.

Instruction Abbreviation has further implications to the decoupling of the processor from its program ISA representation. This decoupling affects the instruction memory and associated data path as well as the execution core design. It has a further profound affect on the programming model and development environment. FIG. 16 shows a general system and process 1600 of a decoupled processor using instruction abbreviation as the decoupling mechanism.

Virtual ISA 1610 is an ISA that is not constrained with instruction format restrictions tied to physical memory sizes but rather optimized to an application's requirements and a target execution core 1615. The Virtual ISA instruction formats are consequently not limited to a fixed size and can be optimized by instruction type. A program written in the Virtual ISA assembly code would have an intermediate representation in binary form with variable width but with one instruction memory address associated with each instruction to maintain a sequential programming model. The set of instructions used in the compiled and optimized code segment 1620 is justified to bit zero and the automated abbreviation tool 1625 does the tradeoff analysis to abbreviate the variable width instruction program to a fixed B-width abbreviated form 1630 to be stored in the instruction memory 1635. The automated abbreviation tools also creates the appropriate decoding tables 1640 for storage in the decoder subsystem 1645 translation memory (TM) 1650 of the processor 1655. The decoder 1645 translates the fetched B-bit instructions 1658 through TM 1650 accesses and use of an internal shuffler into execution core optimized formats 1660 as best required by the implementation. Consequently, in the ManArray decoupled processor core, there is no requirement for having a fixed width instruction format, though this is not precluded as an implementation choice.

By examination of an application's requirements, it is possible to optimize the execution core 1615 for larger register files, to support new instructions without concern for fixed format specification restrictions, and increased function specification of existing and new instructions. For example, the execute VLIW (XV) instructions could be increased in size to expand the distributed VIM offset address fields described in U.S. Pat. No. 6,173,389 "Methods and Apparatus for Dynamic Very Long Instruction Word Sub-Instruction Selection for Execution Time Parallelism in an Indirect Very Long Instruction Word Processor."

While the present invention is disclosed in a presently preferred context, it will be recognized that the teachings of the present invention may be variously embodied consistent with the disclosure and claims. By way of example, the present invention is disclosed in connection with various aspects of the ManArray architecture. It will be recognized that the present teachings may be adapted to other present and future architectures to which they may be beneficial, or the ManArray architecture as it evolves in the future.

We claim:

1. A translation memory (TM) system comprising:
   a memory for storing fixed width abbreviated instructions in place of variable width virtual instructions making up a program, wherein each type of virtual instruction has an instruction format bit width not restricted by a physical memory size and each fixed width abbreviated instruction has an X-TM index value and a Y-TM index value; and
   a decoder having an X-TM, a Y-TM, and a shuffler, wherein the X-TM and the Y-TM store decoding tables and a fetched abbreviated instruction causes an access of the X-TM based on the X-TM index value to fetch an X-fragment and an access of the Y-TM based on the Y-TM index value to fetch a Y-fragment, the X-fragment and the Y-fragment combined in the shuffler to produce a core instruction formatted to execute on a processor's execution core.

2. The translation memory (TM) system of claim 1, wherein the decoder further comprising:
   an X-TM base address register;
   an X-TM address adder for adding an X value read from the X-TM base address register with the X-TM index value creating an X-TM address;
   a Y-TM base address register;
   a Y-TM address adder for adding a Y value read from the Y-TM base address register with the Y-TM index value creating a Y-TM address, wherein the X-TM is addressed by the X-TM address to fetch the X-fragment and the Y-TM is addressed by the Y-TM address to fetch the Y-fragment.

3. The TM system of claim 1, wherein each X-TM entry comprises bits in bit positions which do not change between virtual instructions within a group of virtual instructions and each Y-TM entry comprises bits in bit positions which do change between virtual instructions within the group of virtual instructions.

4. The TM system of claim 1, wherein each virtual instruction is associated with an instruction memory address to maintain a sequential programming model.

5. The TM system of claim 1, wherein the processor's execution core is configured to use a larger register file than is supported by a fixed format instruction, wherein the larger register file is supported by select virtual instructions.

6. The TM system of claim 1, wherein the processor's execution core is configured for increased function capabilities than is supported by a fixed format instruction, wherein the increased function capabilities are supported by select virtual instructions.

7. The TM system of claim 1 wherein the processor's execution core is configured to use a larger very long instruction word memory (VIM) than is supported by a fixed format instruction, wherein the larger VIM is supported by select virtual instructions.

8. The TM system of claim 1, wherein the variable width virtual instructions have an intermediate representation in binary form with variable width.

9. The TM system of claim 1 further comprises:
   an automated abbreviation tool that abbreviates each of the variable width virtual instructions to a fixed width abbreviated instruction form having the X-TM index value and the Y-TM index value.

10. The TM system of claim 9, wherein the automated abbreviation tool creates the decoding tables.

11. The TM system of claim 1, wherein the shuffles specifies the order X-fragment bits are combined with Y-fragment bits to produce the core instruction.

12. The TM system of claim 11, wherein the order is defined by a mask, wherein a mask bit of 1 selects a corresponding bit in the X-fragment and a mask bit of 0 selects a corresponding bit in the Y-fragment.

13. The TM system of claim 2, wherein the abbreviated instruction memory inserts an X-TM management instruction to reload the X-TM base address register with a new X value.

14. The TM system of claim 13, wherein branch target addresses of the program are remapped based on the inserted X-TM management instruction in the abbreviated instruction memory.

* * * * *